United States Patent
Eichen et al.

(10) Patent No.: US 8,295,467 B2
(45) Date of Patent: Oct. 23, 2012

(54) SYSTEM FOR AND METHOD OF RE-USING PUBLIC DOMAIN IDENTIFICATIONS

(75) Inventors: Elliot Eichen, Arlington, MA (US); Rezwanul Azim, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 485 days.

(21) Appl. No.: 12/650,049

(22) Filed: Dec. 30, 2009

(65) Prior Publication Data
US 2011/0158396 A1    Jun. 30, 2011

(51) Int. Cl.
*H04M 7/00*    (2006.01)
*H04L 12/66*    (2006.01)
(52) U.S. Cl. .................... 379/229; 379/219; 370/352
(58) Field of Classification Search ............... 379/229, 379/219, 221.08; 370/352
See application file for complete search history.

(56) References Cited

U.S. PATENT DOCUMENTS

2009/0279538 A1 * 11/2009 Merino Gonzalez et al. 370/352
* cited by examiner

*Primary Examiner* — Thjuan K Addy (57) ABSTRACT

A system for and method of re-using telephone number is presented. The system and method may include receiving, via an input/output module, a public call invite request message to establish a communication session between a calling party and a called party, establishing, via the input/output module, a first communication session with the calling party based at least in part on the public call invite request message, transmitting, via a telephone number re-use module, a plurality of private call invite request messages to a plurality of communication devices associated with the called party, establishing, via the telephone number re-use module, a second communication session with the called party based at least in part on the plurality of private call invite request messages, and coupling, via a processing module, the first communication session and the second communication session to establish the communication session between the calling party and the called party.

21 Claims, 4 Drawing Sheets

SYSTEM FOR AND METHOD OF RE-USING PUBLIC DOMAIN IDENTIFICATIONS

BACKGROUND INFORMATION

Recently, with the development of telecommunication services and networks, communication devices have become more prevalent. Often times, a user may have a plurality of communication devices each having disparate telephone numbers. Keeping track of each telephone number may be confusing and time consuming. In order to reduce the confusion and improve efficiency of keeping track of telephone numbers, service providers introduced "one-telephone number" telephony services that provide call connection to the plurality of communication devices of the user. However, the current "one-telephone number" telephony service requires users to either acquire a new telephone number, or to port a telephone number of a communication device of the user to act as a pilot number and acquire a different number for the communication device of the user. Thus, the current "one-telephone number" telephony service is inefficient and increase the number of telephone numbers associated with the user.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

An exemplary embodiment provides a system and a process for re-using public domain identifications. For example, a public domain identification may be associated with a plurality of private domain identifications. The public domain identification may include one or more identifications known to other users. For example, the public domain identification may include a public telephone number, a public uniform resource identifier (URI), a public uniform resource locator (URL), a public electronic mail address, a public screen name, and/or other public identifications. The private domain identification may include one or more identifications not known to other users. For example, the private domain identification may include a private telephone number, a private uniform resource identifier (URI), a private uniform resource locator (URL), a private electronic mail address, a private screen name, and/or other private identifications. In an exemplary embodiment, a private telephone number of a plurality of private telephone numbers may be assigned as the public telephone number for the plurality of private telephone numbers. In another exemplary embodiment, a private uniform resource identifier (URI) of a plurality of private uniform resource identifiers (URIs) may be assigned as the public uniform resource identifier (URI) of the plurality of private uniform resource identifiers (URIs). In other exemplary embodiments, a private electronic mail address of a plurality of electronic mail addresses may be assigned as the public electronic mail address of the plurality of electronic mail addresses. For example, a first user communication device associated with a calling party may attempt to establish a communication session with a called party via a plurality of user communication devices having a plurality of disparate telephone numbers associated with the called party. The calling party may utilize the first user communication device to dial a public telephone number associated with the plurality of user communication devices having a plurality of disparate private telephone numbers associated with the called party. In an exemplary embodiment, the public telephone number may be selected from any telephone number of the plurality of private telephone numbers of the plurality of user communication devices of the called party. The first user communication device may establish a communication session with a call control application system by dialing the public telephone number. The call control application system may establish a first communication session with the calling party via the first user communication device. The call control application system may also search a database of telephone numbers and identify the plurality of private telephone numbers associated with the public telephone number. The call control application system may establish a second communication session with the called party via a user communication device of the plurality of user communication devices associated with the called party. The call control application system may couple the first communication session and the second communication session in order to establish a communication session between the calling party and the called party.

Figure 1:
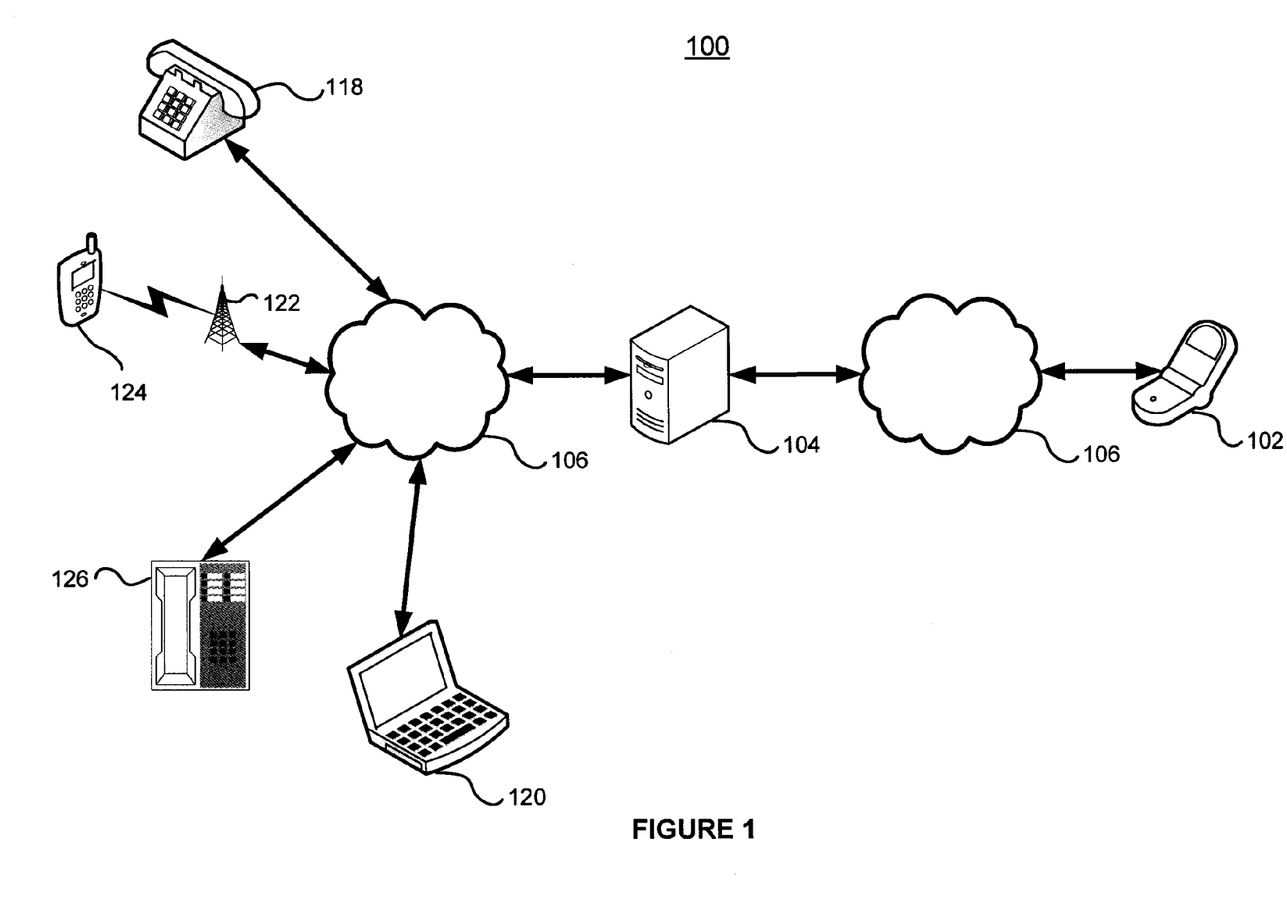
FIG. 1 is a schematic diagram illustrating a system for re-using telephone numbers according to a particular embodiment.

FIG. 1 is a schematic diagram illustrating a system according to particular embodiments. As illustrated in FIG. 1, system 100 may include a user communication device 102 associated with a calling party which may establish a communication session with a communication device associated with a called party via a call control application system 104 and a communication network 106. The communication network 106 may be communicatively coupled with at least one communication device associated with the called party including a residential telephone 118, a computer 120, and a business telephone 126. Other communication device associated with the called party may communicate with the communication network 106 via one or more intermediary devices, such as a transmitter/receiver 122. For example, a wireless mobile communication device 124 may communicate with the communication network 106 via the transmitter/receiver 122.

In an exemplary embodiment, a calling party associated with the user communication device 102 may attempt to establish a communication session with a called party by dialing a public telephone number associated with the called party. The call control application system 104 may receive a communication session request via the communication network 106 and establish a first communication session with the calling party via the user communication device 102. The call control application system 104 may identify a plurality of disparate private telephone number associated with a plurality of communication devices of the called party based at least in part on the public telephone number. In an exemplary embodiment, the public telephone number associated with the called party may be the same telephone number as one of a plurality of disparate private telephone numbers associated with the called party. The call control application system 104 may transmit a communication session request to each of the plurality of communication devices (e.g., the residential telephone 118, the computer 120, the wireless mobile communication device 124, and the business telephone 126) associated with the called party. The call control application system 104 may establish a second communication session with a communication device of the plurality of communication devices associated with the called party. Subsequently, the call control application system 104 may couple the first communication session and the second communication session in order to establish a communication session between the calling party and the called party.

The user communication device 102 may be a computer, a personal computer, a laptop, a cellular communication device, a workstation, a mobile device, a phone, a handheld PC, a personal digital assistant ("PDA"), a thin system, a fat system, a network appliance, an Internet browser, or other any other device that may allow a user to communicate with the call control application system 104 and the plurality of communication devices (e.g., the residential telephone 118, the computer 120, the wireless mobile communication device 124, and the business telephone 126) associated with other users via the communication network 106. For example, a calling party associated with the user communication device 102 may transmit to and receive from the call control application system 104, one or more message signals via the communication network 106.

The call control application system 104 may include one or more servers. For example, the call control application system 104 may include a UNIX based server, Windows 2000 Server, Microsoft IIS server, Apache HTTP server, API server, Java sever, Java Servlet API server, ASP server, PHP server, HTTP server, Mac OS X server, Oracle server, IP server, or other independent server to relay one or more transmitted messages from a first user to an intended recipient. Also, the call control application system 104 may include one or more Internet Protocol (IP) network server or public switch telephone network (PSTN) server.

The call control application system 104 may include one or more databases. For example, the call control application system 104 may include a flash memory, a redundant array of inexpensive disks ("RAID"), tape, disk, a storage area network ("SAN"), an interne small computer systems interface ("iSCSI") SAN, a Fibre Channel SAN, a common Internet File System ("CIFS"), network attached storage ("NAS"), a network file system ("NFS"), or other computer accessible storage. Also, the call control application system 104 may include one or more Internet Protocol (IP) network server and/or public switch telephone network (PSTN) server. For example, the call control application system 104 may process and encapsulate telephony signals (e.g., digital audio) in a data packet stream over the communication network 106 using Internet Protocol (IP). The call control application system 104 may provide direct inward dialing (DID) VoIP services and/or access a VoIP service.

The call control application system 104 may include one or more storage devices including, without limitation, paper card storage, punched card, tape storage, paper tape, magnetic tape, disk storage, gramophone record, floppy disk, hard disk, ZIP disk, holographic, molecular memory. The one or more storage devices may also include, without limitation, optical disc, CD-ROM, CD-R, CD-RW, DVD, DVD-R, DVD-RW, DVD+R, DVD+RW, DVD-RAM, Blu-ray, Mini-disc, HVD and Phase-change Dual storage device. The one or more storage devices may further include, without limitation, magnetic bubble memory, magnetic drum, core memory, core rope memory, thin film memory, twistor memory, flash memory, memory card, semiconductor memory, solid state semiconductor memory or any other like mobile storage devices.

The communication network 106 may be coupled to the call control application system 104 and one or more communication devices (e.g., the user communication device 102, the residential telephone 118, the computer 120, the wireless mobile communication device 124, and the business telephone 126). The communication network 106 may be a wireless network, a wired network or any combination of wireless network and wired network. For example, the communication network 106 may include one or more of a public switched telephone network (PTSN), a signaling system #7 (SS7) network, a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and receiving a data signal. In addition, the communication network 106 may include, without limitation, telephone line, fiber optics, IEEE Ethernet 802.3, wide area network ("WAN"), local area network ("LAN"), or global network such as the Internet. The communication network 106 may support an Internet network, a wireless communication network, a cellular network, or the like, or any combination thereof. The communication network 106 may further include one, or any number of the exemplary types of networks mentioned above operating as a stand-alone network or in cooperation with each other. The communication network 106 may include a plurality of mobile switching centers (MSCs) and a plurality of signaling control points (SCPs).

The communication network 106 may utilize one or more protocols of one or more network elements to which it is communicatively coupled. The communication network 106 may translate to or from other protocols to one or more protocols of network devices. Although the communication network 106 is depicted as one network, it should be appreciated that according to one or more embodiments, the communication network 106 may comprise a plurality of interconnected networks, such as, for example, a service provider network, the Internet, a broadcaster's network, a cable television network, corporate networks, and home networks.

The transmitter/receiver 122 coupling the wireless mobile communication device 124 to the communication network 106 may be a repeater, a microwave antenna, a cellular tower, or another network access device capable of providing connectivity between two different network mediums. Transmitter/receiver 122 may be capable of sending and receiving signals via a mobile network, a paging network, a cellular network, a satellite network or a radio network. Transmitter/receiver 122 may provide connectivity to one or more wired networks and may be capable of receiving signals on one medium such as a wired network and transmitting the received signals on a second medium such as a wireless network.

Figure 2:
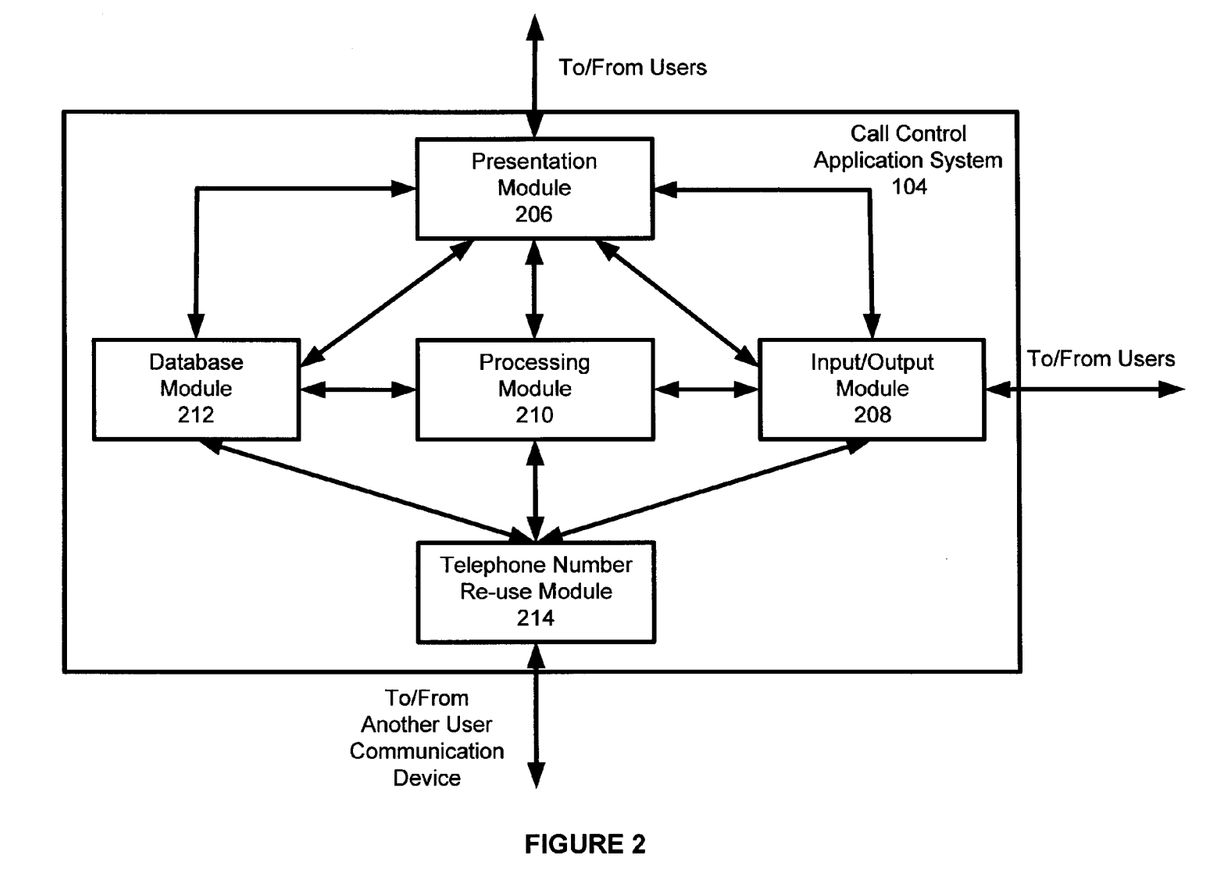
FIG. 2 is a block diagram of a hardware component of the call control application system of a particular embodiment.

FIG. 2 is a block diagram of a hardware component of the call control application system of a particular embodiment. The call control application system 104 may include a presentation module 206, an input/output (I/O) module 208, a processing module 210, a database module 212, and a public domain re-use module 214. It is noted that the modules 206, 208, 210, 212, and 214 are exemplary and the functions performed by one or more of the modules may be combined with that performed by other modules. The functions described herein as being performed by the modules 206, 208, 210, 212, and 214 also may be separated and may be located or performed by other modules. Moreover, the modules 206, 208, 210, 212, and 214 may be implemented at other components of the system 100.

The input/output (I/O) module 208 may receive one or more public call invite request messages from the user communication device 102. For example, the one or more public call invite request messages may be transmitted via signaling system number #7 (SS7) protocol or session initiation protocol (SIP) in order to establish a communication session (e.g., voice call or video call) over the communication network 106. The public call invite request messages may include information associated with parties of the communication session. Also, the public call invite request messages may include a public telephone number (e.g., an original called telephone number (OCN) or a pilot telephone number), a public uniform resource identifier (URI), a public uniform resource locator (URL) to identify parties (e.g., calling party and called party), a public electronic mail address, and/or a public screen name associated with the communication session. In an exemplary embodiment, the public call invite request messages may include a public telephone number (e.g., an original called telephone number (OCN) or a pilot telephone number) associated with a called party. For example, the public telephone number may be a telephone number associated with a communication device of a plurality of communication devices (e.g., the residential telephone 118, the computer 120, the wireless mobile communication device 124, and the business telephone 126) associated with the called party. In another exemplary embodiment, the public call invite request messages may include a message header field (e.g., called "User-Agent") containing description of the software, hardware, and/or protocols used in establishing a communication session. The input/output (I/O) module 208 may use automatic number identification (ANI) information to process the one or more call invite request messages.

The input/output (I/O) module 208 may preprocess the public call invite request messages received from the user communication device 102 (e.g., filter, sort, format, and aggregate). In an exemplary embodiment, the preprocessing of the public call invite request messages received by the input/output (I/O) module 208 may include filtering the public call invite request messages and eliminating erroneous or defective public call invite request messages, sorting the public call invite request messages in accordance with the locations associated with calling party of the communication session (e.g., numbering plan assignment (NPA) information or area code information), formatting the public call invite request messages into desired format (e.g., identify various segments of the public call invite request messages), and aggregating the public call invite request messages from the user communication device 102 to be processed.

The one or more call invite request messages may be transferred from the input/output (I/O) module 208 to the processing module 210 for processing. The processing module 210 may process the public call invite request messages to establish a first communication session with the calling party. The processing module 210 may include a plurality of sub-analytical modules to establish a communication session. For example, the processing module 210 may identify the calling party associated with the communication session based at least in part on the public call invite request message. The processing module 210 may instruct the input/output (I/O) module 208 to establish a first communication session with the calling party. The processing module 210 may also identify a called party associated with the communication session based at least in part on the public call invite request message. The processing module 210 may access the database module 212 to identify one or more private domain identifications (e.g., private telephone numbers, private uniform resource identifiers (URIs), private uniform resource locators (URLs), private electronic mail addresses, and/or private screen names) associated with the called party. For example, the called party may have a plurality of communication devices each having a disparate private telephone number. Also, the called party may have a public telephone number (e.g., an original called telephone number (OCN) or a pilot telephone number) associated the plurality of communication devices of the called party. In an exemplary embodiment, public telephone number may be the same as a private telephone number associated with a communication device of the plurality of communication devices of the called party. In another exemplary embodiment, public uniform resource identifier (URI) may be the same as a private uniform resource identifier (URI) associate with a communication device of the plurality of communication devices of the called party.

In another exemplary embodiment, the processing module 210 may access the database module 212 to identify whether parties (e.g., the calling party and the called party) associated with a communication session may be associated with the call control application system 104 of a service provider. The processing module 210 may access the database module 212 to identify the called party associated with the public call invite request message. In an exemplary embodiment, the processing module 210 may identify the public telephone number (e.g., an original called telephone number (OCN) or a pilot telephone number) in the public call invite request message provided by the user communication device 102. The processing module 210 may search the database module 212 to identify the called party based at least in part on the public domain identification (e.g., public telephone number) in the call invite request message. For example, the public domain identification (e.g., public telephone number, public uniform resource identification (URI)) may be associated with a communication device of a plurality of communication devices of the called party. The processing module 210 may identify other private domain identifications (e.g., private telephone numbers, public uniform resource identification (URI)) stored in the database module 212 associated with other communication devices of the plurality of communication devices of the called party. The processing module 210 may terminate the public call invite request message and generate a private call invite request message for each of the plurality of communication devices associated with the called party. The processing module 210 may provide the private call invite request messages to the public domain re-use module 214 in order to transmit the private call invite request messages to each of the plurality of communication devices (e.g., the residential telephone 118, the computer 120, the wireless mobile communication device 124, and the business telephone 126) associated with the called party.

The processing module 210 may generate or instruct the public domain re-use module 214 to generate private call invite request messages to each of the plurality of communication devices associated with the called party based at least in part on the public call invite request message. The private call invite request messages may include identity of the communication devices associated with the called party of the communication session, location of the parties associated with the communication session, and/or other information that may be necessary to establish a communication session between the calling party and the called party. The public domain re-use module 214 may simultaneously transmit the private call invite request messages to each of the plurality of communication devices associated with the called party via the communication network 106 (e.g., a mobile switching center (MSC) or a signaling control point (SCP)). Upon reception of the private call invite request message at the plurality of communication devices associated with the called party, the called party may accept the private call invite request message and establish a second communication session with the call control application system 104.

The processing module 210 may couple the first communication session and the second communication session in order to establish a communication session between the calling party and the called party. In an exemplary embodiment, the input/output (I/O) module 208 may establish a first communication session with the calling party. The public domain re-use module 214 may establish a second communication session with the called party after transmitting a private call invite request message to each of the plurality of communication devices of the called party. The processing module 210 may couple the input/output (I/O) module 208 and the public domain re-use module 214 in order to establish a communication session between the calling party and the called party.

The presentation module 206 may provide an interface between the communication devices (e.g., user communication device 102, the residential telephone 118, the computer 120, the wireless mobile communication device 124, and the business telephone 126) associated with parties of a communication session. The presentation module 206 may include a user interface, e.g., a graphical user interface, to receive one or more queries/requests from the parties to a communication session and to provide a communication session status to the parties via the communication devices. The presentation module 206 may provide a separate or a unified graphical user interface. The presentation module 206 may include an Application Programming Interface (API) to interact with the communication devices (e.g., the user communication device 102, the residential telephone 118, the computer 120, the wireless mobile communication device 124, and the business telephone 126). In an exemplary embodiment, the presentation module 206 may present one or more graphical contents or displays to the parties associated with a communication session via the communication devices.

In another exemplary embodiment, the presentation module 206 may receive one or more queries/requests from a communication device (e.g., the user communication device 102, the residential telephone 118, the computer 120, the wireless mobile communication device 124, and the business telephone 126). In response to receiving the one or more queries/requests from a party via the communication device, the presentation module 206 may provide the one or more queries/requests to the input/output (I/O) module 208, the processing module 210, the database module 212, and the public domain re-use module 214. For example, the presentation module 206 may receive one or more queries/requests from the communication device to create a public domain identification (e.g., public telephone number (e.g., an original called telephone number (OCN) or a pilot telephone number), public uniform resource identifier (URI), public uniform resource locator (URL), public electronic mail address, public screen name) associated with a party. In response to receiving the one or more queries/requests from the party via the communication device, the presentation module 206 may send the one or more queries/requests to the database module 212 and/or the public domain re-use module 214 to create a public domain re-use service account.

The database module 212 may create and store identification information and/or telephone account information associated with the party based at least in part on the one or more received queries/requests. The public domain number re-use module 214 may also create and store identification information and/or telephone account information associated with the party based at least in part on the one or more received queries/request. The telephone account information may include a plurality of private telephone numbers of the plurality of communication devices associated with a party and the public telephone number (e.g., original telephone number (OCN) or the pilot telephone number) that may be linked to the plurality of private telephone numbers of the plurality of communication devices. The public domain re-use module 214 may store one or more telephone numbers provided by the party (e.g., private telephone numbers and public telephone numbers).

In other exemplary embodiments, the presentation module 206 may receive one or more queries/requests from a communication device (e.g., the user communication device 102, the residential telephone 118, the computer 120, the wireless mobile communication device 124, and the business telephone 126) to select a public telephone number associated with a party. For example, a party may provide a plurality of private telephone numbers associated with a plurality of communication devices of the party to the presentation module 206. The party may also provide one or more queries/requests to select one of the plurality of private domain identifications (e.g., private telephone numbers, private uniform resource identifiers (URIs), private uniform resource locators (URLs), private electronic mail addresses, private screen names) as the public domain identification (e.g., public telephone number, public uniform resource identifier (URI), public uniform resource locator (URL), public electronic mail address, public screen name) associated with the plurality of communication devices of the party. Also, the presentation module 206 may provide the one or more queries/requests to the processing module 210 and the processing module 210 may select a private telephone number as the public telephone number for the plurality of communication devices of the party.

The database module 212 may store and manage public domain re-use service accounts associated with the parties of a communication session. The database module 212 may provide an interface, e.g., a uniform interface, for other modules within the call control application system 104 and may write, read, and search parties information stored in one or more repositories or databases. The database module 212 may also perform other functions, such as, but not limited to, concurrent access, backup and archive functions. Due to limited amount of storing space the database module 212 may compress, store, transfer or discard the public domain re-use service account information associated with parties of a communication session stored within, after a period of time, e.g., a year. The database module 212 may provide telephone number re-use account information of parties associated with a communication session to the processing module 210. For example, the database module 212 may provide identity information, a public telephone number, and/or a plurality of private telephone numbers associated with the parties to the processing module 210. In an exemplary embodiment, the database module 212 may provide a plurality of private telephone numbers associated with a plurality of communication devices associated with a called party. The database module 212 may be network accessible storage and may be local, remote, or a combination thereof to modules 206, 208, 210, and/or 214.

The database module 212 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, database module 212 may be a database, such as an Oracle database, a Microsoft SQL Server database, a DB2 database, a MySQL database, a Sybase database, an object oriented database, a hierarchical database, or other database. The database module 212 may utilize flat file structures for storage of data.

The public domain re-use module 214 may provide an interface between the call control application system 104 and a plurality of communication devices associated with a called party (e.g., the residential telephone 118, the computer 120, the wireless mobile communication device 124, and the business telephone 126). For example, the public domain re-use module 214 may facilitate a transmission of private call invite request messages to the plurality of communication devices associated with a called party. The public domain re-use module 214 may include one or more databases to store public domain re-use service account having public telephone numbers and one or more private telephone numbers of the plurality of communication devices associated with the parties of a communication session. The public domain re-use module 214 may interact with database module 212 to update or modify the public domain re-use service account associated with the users of a communication session.

The public domain re-use module 214 may generate and transmit private call invite request messages to the plurality of communication devices associated with a called party (e.g., the residential telephone 118, the computer 120, the wireless mobile communication device 124, and the business telephone 126). In an exemplary embodiment, the public domain re-use module 214 may generate a private call invite request message for each of the plurality of communication devices associated with a called party. The public domain re-use module 214 may simultaneously transmit the private call invite request messages to each of the plurality of communication devices associated with the called party. Upon receiving an acceptance of the private call invite request message, the public domain re-use module 214 may establish a second communication session with the called party.

Figure 3:
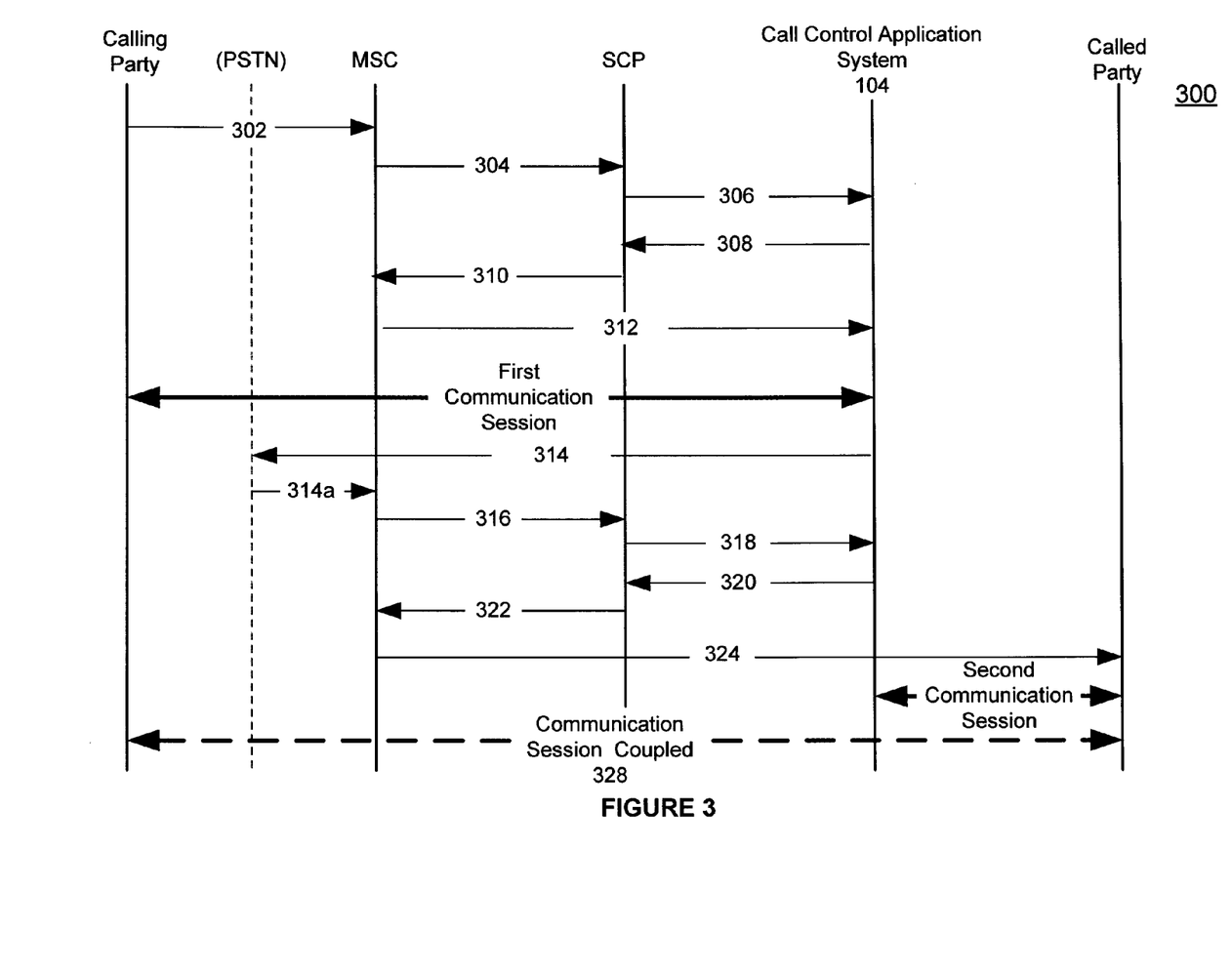
FIG. 3 is a system signaling flow diagram for re-using a telephone number according to a particular embodiment.

FIG. 3 illustrates a system signaling flow diagram for re-using a telephone number according to a particular embodiment. This exemplary method 300 may be provided by way of example, as there are a variety of ways to carry out the method. The method 300 shown in FIG. 3 can be executed or otherwise performed by one or a combination of various systems. The method 300 is described below may be carried out by the system and network shown in FIGS. 1-2, by way of example, and various elements of the system and network are referenced in explaining the example method of FIG. 3. Each step shown in FIG. 3 represents one or more processes, methods or subroutines carried out in exemplary method 300. Referring to FIG. 3, exemplary method 300 may begin at step 302.

At step 302, a calling party may dial a public telephone number associated with a called party via the user communication device 102. The user communication device 102 associated with the calling party may transmit a public call invite request message (e.g., via signaling system #7 (SS7) protocol). In an exemplary embodiment, the user communication device 102 may be a mobile communication device, the public call invite request message may be transmitted by the user communication device 102 via to a mobile switching center (MSC) of the communication network 106 (e.g., PSTN). The mobile switching center (MSC) may be communicatively coupled to other service providers via the communication network 106. The mobile switching center (MSC) may serve as an entry point for incoming/outgoing calls into the communication network 106 associated with a service provider. After transmitting a public call invite request message from the user communication device 102, the method 300 may proceed to step 304.

At step 304, the public call invite request message may be forwarded to a signaling control point (SCP) of the communication network 106. In an exemplary embodiment, the signaling control point (SCP) may provide routing and other instructions to a service switching point (SSP) as defined by the signaling system #7 (SS7) protocol. The mobile switching center (MSC) may enable a trigger function for the public telephone number associated with the called party, a terminating trigger message (e.g., HTTP message over TCP/IP) may be transmitted to the signaling control point (SCP) (e.g., via the signaling system #7 (SS7) protocol, the Sigtran protocol, or the SIP protocol) along with the public call invite request message. In other exemplary embodiment, the signaling control point (SCP) may only transmit the terminating trigger message. After forwarding the public call invite request messages to the signaling control point (SCP), the method 300 may proceed to step 306.

At step 306, the signaling control point (SCP) may forward the public call invite request message or the terminating trigger message to the call control application system 104. The call control application system 104 may process the public call invite request message or the terminating trigger message provided by the signaling control point (SCP). In an exemplary embodiment, the public call invite request message may include the public telephone number dialed by the calling party, and the call control application system 104 may determine whether the public telephone number dialed by the calling party matches a public telephone number stored in a database (e.g., database module 212) of telephone numbers. In the event that the call control application system 104 may determine a match between the public telephone number dialed by the calling party and a public telephone number stored in the database, the call control application system 104 may determine that a communication session may be establish between the calling party and the called party. After forwarding the public call invite request message or the terminating trigger message to the call control application system 104, the method 300 may proceed to step 308.

At step 308, the call control application system 104 may provide a public call invite request confirmation message back to the signaling control point (SCP). For example, the public call invite request confirmation message may instruct the signaling control point (SCP) to redirect the communication session to a different telephone number (e.g., call forwarding unconditional) that may terminate at the call control application system 104. After providing the call invite request confirmation message back to the signaling control point (SCP), the method 300 may proceed to step 310.

At step 310, the signaling control point (SCP) may provide the call invite request confirmation message (e.g., via the signaling system #7 (SS7) protocol, Sigtran protocol, or SIP protocol) back to the mobile switching center (MSC). The call invite request confirmation message may inform the mobile switching center (MSC) that a communication session may be established between the calling party and the called party. The call invite request confirmation message may replace the public telephone number dialed by the calling party with one or more private telephone numbers that may be stored in database. The call control application system 104 may identify the private telephone numbers associated with the called party in order to establish a communication session between the calling party and the called party. After providing the call invite request information message back to the mobile switching center (MSC), the method 300 may proceed to step 312.

At step 312, the user communication device 102 may establish a first communication session with the call control application system 104. For example, information or data may be transmitted from the user communication device 102 to the call control application system 104 or vice versa. The user communication device 102 may be in communication with the call control application system 104 via the mobile switching center (MSC) and the signaling control point (SCP) of the communication network 106. In an exemplary embodiment, the call control application system 104 may terminate the public call invite request message and the user communication device 102 may be communicating with call control application system 104. The call control application system 104 may attempt to establish a second communication session with one of a plurality of communication devices associated with the called party (e.g., the residential telephone 118, the computer 120, the wireless mobile communication device 124, and the business telephone 126). After establishing a first communication session between the user communication device 102 and the call control application system 104, the method 300 may proceed to step 314.

At step 314, the call control application system 104 may transmit a private call invite request message to each of the plurality of telephone numbers associated with the called party. The call control application system 104 may generate and transmit a private call invite request message to each of the plurality of private telephone numbers (e.g., a residential telephone 118, a computer 120, a mobile communication device 124, and a business telephone 126.) associated with the called party. For example, a private call invite request message may be transmitted to the plurality of communication devices associated with the called party including a communication device having a private telephone number that matches the public telephone number (e.g., original called number (OCN) or the pilot number, as discussed in step 302). For example, the call control application system 104 may transmit the private call invite request messages to the communication network 106 (e.g., a public switch telephone network (PTSN)). In an exemplary embodiment, in the event that the called party is associated with a mobile user device, the private call invite request message may be transmitted to the mobile switching center (MSC) of the communication network 106, as shown in step 314a. In other exemplary embodiments, in the event that the called party is associated with a residential telephone 118 or a business telephone 126, the private call invite request message may be transmitted to the signaling control point (SCP) of the communication network 106. After transmitting a private call invite request message to each of the plurality of communication devices associated with the called party, the method 300 may proceed to step 316.

At step 316, the mobile switching center (MSC) may forward the private call invite request messages to the signaling control point (SCP) within the communication network 106, in a similar manner as described above in step 304. Also, the mobile switching center (MSC) may forward a trigger message along with the private call invite request message to the signaling control point (SCP). Subsequently, at step 318, the signaling control point (SCP) may forward the private call invite request messages and the trigger message to the call control application system 104, in a similar manner as descried above in step 306. After forwarding the private call invite request messages back to the call control application system 104 via the mobile switching center (MSC) and/or the signaling control point (SCP) of the communication network 106, the method 300 may proceed to step 320.

At step 320, the call control application system 104 may forward the private call invite request message to the signaling control point (SCP) and the mobile switching center (MSC) of the communication network 106. In an exemplary embodiment, the call control application system 104 may determine that the call control application system 104 has transmitted the private call invite request messages, the call control application system 104 may directly forward the private call invite request message to the signaling control point (SCP). The call control application system 104 may also process the private call invite request message and the trigger message. For example, the call control application system 104 may determine that the private call invite request message and the trigger message may be transmitted by the call control application system 104. For example, the call control application system 104 may perform a pattern matching analysis to the calling party, called party, telephone numbers associated with the called party, time of call, flag set in the private call invite request messages. The call control application system 104 may forward the private call invite request message to the plurality of communication devices associated with the called party. The call control application system 104 may instruct the mobile switching center (MSC) and/or the signaling control point (SCP) to forward the private call request messages the plurality of communication devices associated with the called party (e.g., a residential telephone 118, a computer 120, a mobile communication device 124, and a business telephone 126.). After processing the private call invite request message and the trigger message, the method 300 may proceed to step 322.

At step 322, the signaling control point (SCP) may forward the private call invite request message to the mobile switching center (MSC). After forwarding the private call invite request messages to the signaling control point (SCP) and the mobile switching center (MSC), the method 300 may proceed to step 324.

At step 324, the mobile switching center (MSC) may forward the call invite request message to the plurality of communication devices (e.g., the residential telephone 118, the computer 120, the wireless mobile communication device 124, and the business telephone 126) associated with the called party. For example, the private call invite request messages may include a private telephone number associated with a corresponding communication device of the called party. In an exemplary embodiment, a communication device of the called party may have a private telephone number that is the same as the public telephone number associated with the plurality of communication devices of the called party. The mobile switching center (MSC) may forward the private call invite request messages to the plurality of communication devices based on the private telephone number included in the private call invite request message. In an exemplary embodiment, the mobile switching center (MSC) may forward each private call invite request message to a corresponding communication device associated with the called party. The called party may accept the private call invite request message at any of the communication devices associated with the called party and a second communication session may be established between the called party and the call control application system 104, as shown in step 326. After forwarding the private call invite request messages to the plurality of communication devices associated with the called party to establish a second communication session, the method may proceed to step 328.

At step 328, the call control application system 104 may couple the first communication session and the second communication session to establish a communication session between the calling party and the called party. For example, the call control application system 104 may bridge the first communication session between the calling party and the call control application system 104 and the second communication between the call control application system 104 and the called party.

Figure 4:
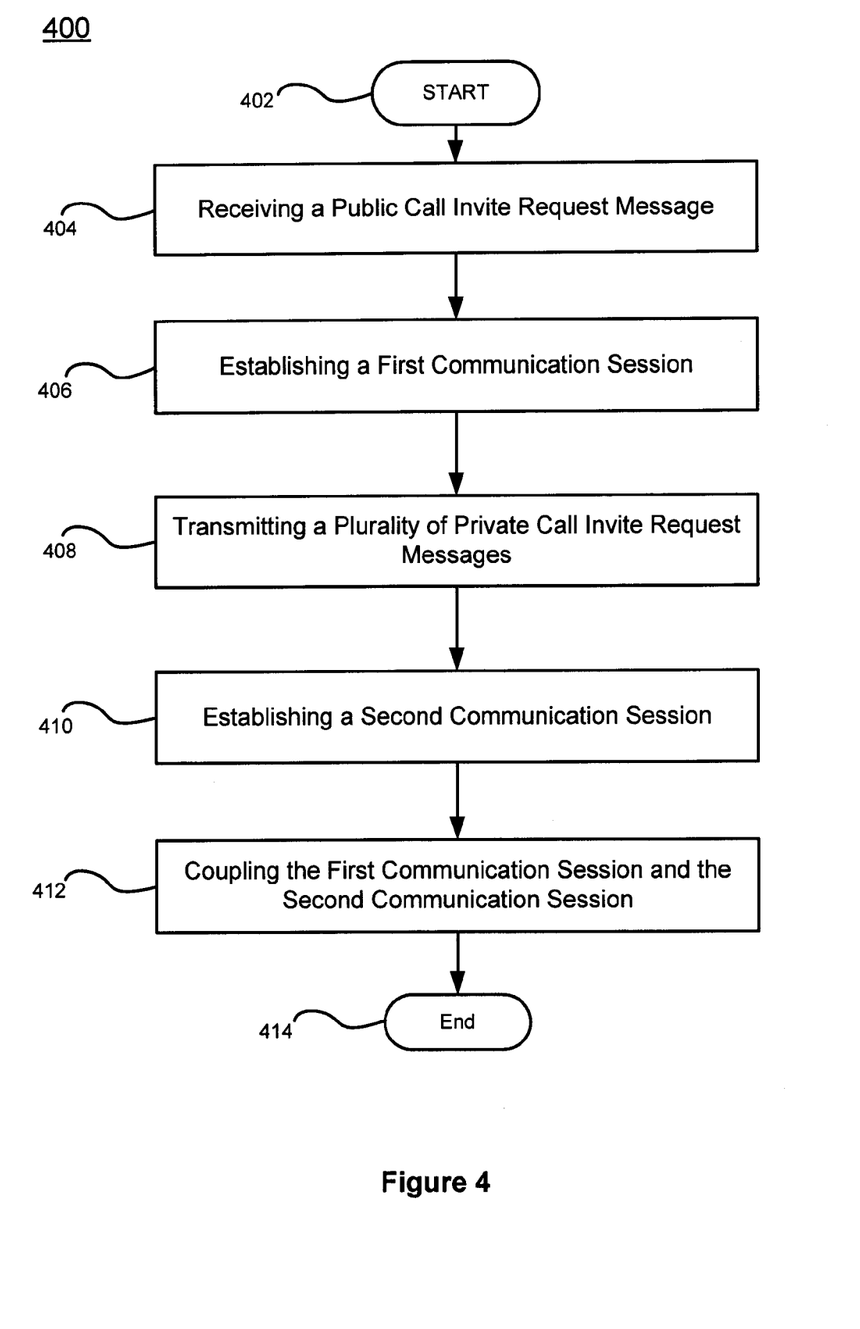
FIG. 4 is a flowchart illustrating a method of re-using a telephone number according to a particular embodiment.

FIG. 4 is a flowchart illustrating a method of re-using a telephone number according to a particular embodiment. This exemplary method 400 may be provided by way of example, as there are a variety of ways to carry out the method. The method 400 shown in FIG. 4 can be executed or otherwise performed by one or a combination of various systems. The method 400 is described below may be carried out by the system and network shown in FIGS. 1-2, by way of example, and various elements of the system and network are referenced in explaining the example method of FIG. 4. Each block shown in FIG. 4 represents one or more processes, methods or subroutines carried out in exemplary method 400. Referring to FIG. 4, exemplary method 400 may begin at block 402.

At block 402, the method 400 for re-using a telephone number to establish a communication session may begin.

At block 404, one or more public call invite request messages may be received from a user communication device 102 to initiate a communication session (e.g., an audio session or a video session). The one or more public call invite request messages may include a public telephone number (e.g., an original called telephone number (OCN) or a pilot telephone number), a uniform resource identifier (URI), or a uniform resource locator (URL) to identify called party associated with a communication session. In an exemplary embodiment, the one or more public call invite request messages may include a public telephone number (e.g., an original called telephone number (OCN) or a pilot telephone number) associated with a called party. For example, the public telephone number may be a telephone number associated with a communication device of a plurality of communication devices (e.g., the residential telephone 118, the computer 120, the wireless mobile communication device 124, and the business telephone 126) associated with the called party. In another exemplary embodiment, the one or more public call invite request messages may include a message header field (e.g., called "User-Agent") containing description of the software, hardware, and/or protocols used in establishing a communication session. The public call invite request messages may be transmitted through the communication network 106 and received at the call control application system 104. In an exemplary embodiment, the public call invited request messages may be transmitted via a mobile switching center (MSC) and a signaling control point (SCP) of the communication network 106 and received at the call control application system 104. After receiving one or more public call invite request messages from the user communication device 102, the method 400 may proceed to block 406.

At block 406, a first communication session may be established between the calling party and the call control application system 104. The call control application system 104 may process the one or more received public call invite request messages. The call control application system 104 may search a database in order to identify the called party based at least in part the public call invite request messages. The call control application system 104 may identify the called party and determine whether a public domain re-use service is associated with the called party. In the event that the called party has a public domain re-use service, the call control application system 104 may establish a first communication session with the calling party. The call control application system 104 may search a database to identify one or more communication devices associated with the called party of a communication session based at least in part on the public call invite request messages. The called party may have a plurality of communication devices each having a disparate private telephone number. Also, the called party may have a public telephone number (e.g., an original called telephone number (OCN) or a pilot telephone number) associated with the plurality of communication devices of the called party. In an exemplary embodiment, the public telephone number may be the same as a private telephone number associated with a communication device of the plurality of communication devices of the called party. The call control application system 104 may identify a plurality of private telephone numbers associated with a plurality of communication devices of the called party. After establishing a first communication session between the calling party and the call control application system 104, the method 400 may proceed to block 408.

At block 408, the call control application system 104 may transmit a plurality of private call invite request messages to a plurality of communication devices associated with the called party. In an exemplary embodiment, the call control application system 104 may terminate the public call invite request message received from the calling party and generate a plurality of private call invite request messages to the plurality of user communication devices associated with the called party. The call control application system 104 may generate the private call invite request messages based at least in part on the public call invite request messages received from the calling party and transmit the plurality of private call invite request messages to the plurality of communication devices of the called party. The call control application system 104 may transmit the plurality of private call invite request messages to the plurality of communication devices associated with the called party via the communication network 106. For example, the call control application system 104 may transmit the plurality of private call invite request messages via the mobile switching center (MSC) and the signaling control point (SCP) of the communication network 106. After transmitting a plurality of private call invite request messages to a plurality of communication devices associated with the called party, the method 400 may proceed to block 410.

At block 410, a second communication session may be established between the called party and the call control application system 104. The call control application system 104 may simultaneously transmit a plurality of private call invite request messages to a plurality of communication devices associated with the called party. The plurality of communication devices may alert (e.g., audio alert, visual alert, or vibration alert) the called party to accept a communication session. The called party may accept the communication session at any of the plurality of communication devices associated with the called party. The called party may accept the private call invite request message and the call control application system 104 may establish a second communication session with the called party. After establishing a second communication session between the call control application system 104 and the called party, the method 400 may proceed to block 412.

At block 412, the call control application system 104 may couple the first communication session and the second communication session. For example, the call control application system 104 may couple the first communication session and the second communication session in order to establish a communication session between the calling party and the called party.

The method 400 may end at block 414.

The description above describes communication devices, a call control application system, a communication network having network elements, storage devices, various networks, and other elements for coupling user via the communication network, some of which are explicitly depicted, others of which are not. As used herein, the term "module" may be understood to refer to computer executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, etc.) separately. The functions described as being performed at various components may be performed at other components, and the various components may be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A method, comprising:
receiving, via an input/output module, a public call invite request message to establish a communication session between a calling party and a called party, wherein the public call invite request message is received via at least one of a mobile switching center and a signaling control point of a communication network;
establishing, via the input/output module, a first communication session with the calling party based at least in part on the public call invite request message;
transmitting, via a public domain re-use module, a plurality of private call invite request messages to a plurality of communication devices associated with the called party;
establishing, via the public domain re-use module, a second communication session with the called party based at least in part on the plurality of private call invite request messages; and
coupling, via a processing module, the first communication session and the second communication session to establish the communication session between the calling party and the called party.

2. The method of claim 1, wherein the public call invite request message includes at least one public domain identification associated with the plurality of communication devices associated with the called party.

3. The method of claim 2, wherein each of the plurality of private call invite request messages includes a private domain identification associated with each of the plurality of communication devices associated with the called party.

4. The method of claim 3, wherein the private domain identification associated with a communication device of the plurality of communication devices is the same as the public domain identification associated with the plurality of communication devices.

5. The method of claim 4, wherein the public domain identification include at least one of a public telephone number, a public uniform resource identifier (URI), and a public electronic mail address and the private domain identification include at least one of a private telephone number, a private uniform resource identifier (URI), and a private electronic mail address.

6. The method of claim 1, further comprising identifying the called party based at least in part on the public call invite request message.

7. The method of claim 1, further comprising identifying the plurality of communication devices associated with the called party based at least in part on the public call invite request message.

8. The method of claim 7, wherein identifying the plurality of communication devices associated with the called party comprises searching a database storing private domain identifications of the plurality of communication devices associated with the called party.

9. The method of claim 8, further comprising generating the plurality of private call request messages, wherein each of the plurality of private call request messages includes a private domain identification for each of the plurality of communication devices associated with the called party.

10. The method of claim 1, wherein the plurality of private call request messages are transmitted via at least one of the mobile switching center and the signaling control point of a communication network.

11. The method of claim 1, wherein establishing a second communication session with the called party is further based on the called party accepting one of the plurality of private call invite request messages at one of the plurality of communication devices of the called party.

12. A computer readable storage medium storing computer executable codes to perform the steps of claim 1.

13. A system, comprising:
an input/output module configured to receive a public call invite request message to establish a communication session between a calling party and a called party, wherein the public call invite request message is received via at least one of a mobile switching center and a signaling control point of a communication network, and establish a first communication session with the calling party based at least in part on the public call invite request message;
a telephone number re-use module configured to transmit a plurality of private call invite request messages to a plurality of communication devices associated with the called party and establish a second communication session with the called party based at least in part on the plurality of private call invite request messages; and
a processing module configured to couple the first communication session and the second communication session to establish the communication session between the calling party and the called party.

14. The system of claim 13, wherein the public call invite request message includes at least one public domain identification associated with the plurality of communication devices associated with the called party.

15. The system of claim 14, wherein each of the plurality of private call invite request messages includes a private domain identification associated with each of the plurality of communication devices associated with the called party.

16. The system of claim 15, wherein the private domain identification associated with a communication device of the plurality of communication devices is the same as the public domain identification associated with the plurality of communication devices.

17. The system of claim 16, wherein the public domain identification include at least one of a public telephone number, a public uniform resource identifier (URI), and a public electronic mail address and the private domain identification include at least one of a private telephone number, a private uniform resource identifier (URI), and a private electronic mail address.

18. The system of claim 15, further comprising a presentation module configured to receive at least one of one or more requests to create a public domain re-use service account and the private domain identification associated with each of the plurality of communication devices associated with the called party.

19. The system of claim 18, further comprising a database module configured to store at least the public domain re-use service account and the private domain identification associated with each of the plurality of communication devices associated with the called party.

20. The system of claim 19, the processing module is further configured to search the database module to identify the private domain identification associated with each of the plurality of communication devices associated with the called party.

21. The system of claim 20, the processing module is further configured to generate the plurality of private call request messages, wherein each of the plurality of private call request messages includes a private domain identification for each of the plurality of communication devices associated with the called party.

* * * * *